Figure 1:
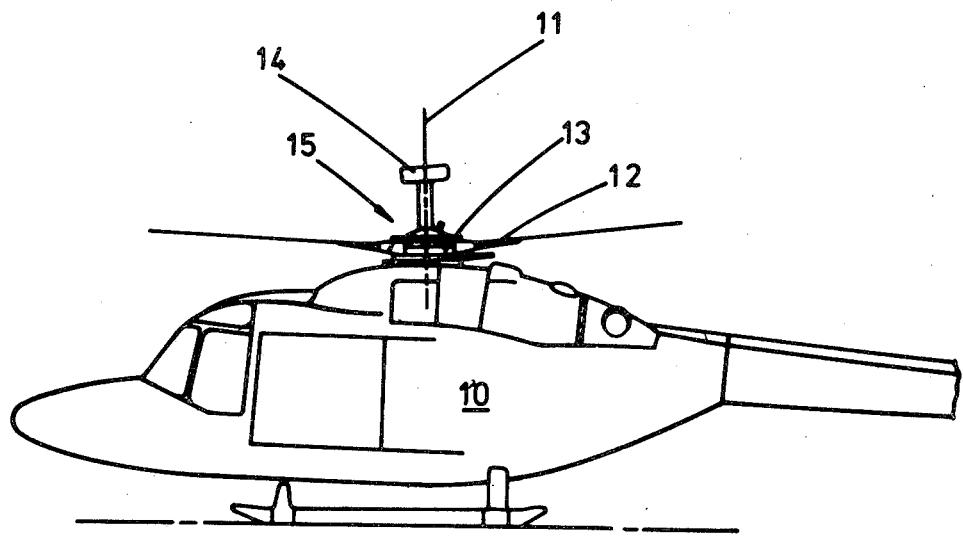

United States Patent [19]

Reid

[11] 4,447,023

[45] May 8, 1984

[54] APPARATUS FOR MOUNTING A DEVICE ABOVE A HELICOPTER ROTOR

[75] Inventor: Peter Reid, Hardington Mandeville, nr. Yeovil, England

[73] Assignee: Westland plc, Yeovil, England

[21] Appl. No.: 367,960

[22] Filed: Apr. 13, 1982

[30] Foreign Application Priority Data

Apr. 27, 1981 [GB] United Kingdom ............... 8112941

[51] Int. Cl.³ ............................................ B64C 27/04
[52] U.S. Cl. .............................. 244/17.11; 343/708; 74/674
[58] Field of Search ................ 244/17.11, 17.27, 12.2, 244/23 C; 74/674, 675, 679; 343/705, 708; 350/302

[56] References Cited

U.S. PATENT DOCUMENTS 4,275,992 6/1981 Andrews et al. ................ 244/17.11
4,277,789 7/1981 Goodman, Jr. et al. ........... 343/708

OTHER PUBLICATIONS

*Vertiflite*, Sep./Oct. issue 1979, "Martin-Marietta Mast Mounted Sight", p. 23.
*Vertifile*, Jan./Feb. issue 1979, "Army Outlook: Flight Control Systems", Maj. Gen. Story C. Stevens, pp. 10-11.
*Aviation Week and Space Technology*, Jun. 22, 1981, Hughes Helicopter Inc. advertisement, pp. 57-68.

Primary Examiner—Trygve M. Blix
Assistant Examiner—Rodney Cori
Attorney, Agent, or Firm—Larson and Taylor

[57] ABSTRACT

A helicopter (10) incorporates apparatus (15) for mounting a device such as an aerial or a sight (14) above a main sustaining rotor (13). The apparatus comprises first and second ring gears (16, 20) located respectively below and above the rotor, the first gear (16) being supported from helicopter structure (17) concentrically of an axis of rotation (11) of the sustaining rotor, support means (37) supporting the second gear and the device above the rotor in a manner permitting relative rotation of the rotor hub, and synchronizing means (25) rotationally fixed to the rotor hub and meshing with the first and second gears to retain the device stationary during rotation of the rotor system. In a preferred embodiment, positioning means are provided to rotate the first gear in either direction of rotation whereby the device can be rotated and selectively positioned independently of the rotation of the rotor.

12 Claims, 6 Drawing Figures

U.S. Patent    May 8, 1984    Sheet 1 of 4    4,447,023

APPARATUS FOR MOUNTING A DEVICE ABOVE A HELICOPTER ROTOR

DESCRIPTION OF INVENTION

This invention relates to helicopters and more particularly to a helicopter including apparatus for mounting a stationary or independently rotatable device above a main sustaining rotor.

It has been proposed to mount a device such as an aerial or sight above a helicopter rotor. Since such a device is required to have either a fixed heading or, preferably, to independently positionable in azimuth, such installations have hitherto been limited to rotors having a hollow rotor shaft through which a stationary mounting shaft can be routed. Many helicopters being manufactured to-day do not have such a hollow shaft and in those that do the trend is to utilise the space for control runs to protect the controls from damage. Such helicopters are therefore precluded from the facility of the fitment of a device such as an aerial or a sight above the rotor.

Accordingly, the invention provides a helicopter having a main sustaining rotor comprising a rotor hub and a plurality of radially extending rotor blades arranged for rotation about a generally vertical axis and including apparatus for supporting a stationary or independently rotatable device above the rotor, wherein said apparatus comprises a first ring gear located below the rotor hub and supported from helicopter structure concentrically of the axis of rotation, a second ring gear above the rotor hub having the same number of gear teeth as the first gear, support means for supporting the second ring gear in a manner permitting relative rotation of the rotor hub, and synchronising means rotationally fixed to the rotor hub and meshing with said first and second gears.

The synchronising means may comprise a pair of spaced-apart gear wheels rotationally fixed to each other and supported at the end of a yoke member extending radially from a fixed attachment to the rotor hub.

Preferably, the synchronising means comprises two pairs of spaced-apart gear wheels, the wheels of each pair being rotationally fixed to each other, respectively supported at the opposite ends of a yoke member extending across the axis of rotation and attached centrally to the rotor hub.

The support means may comprise a central spigot located concentrically of the axis of rotation in axially spaced-apart bearings located in a housing rotationally fixed to the rotor hub. Conveniently, the housing supports an annular gear adapted to drive an electric generator supported by said second gear.

Preferably, the first gear is mounted on the helicopter structure for rotation around the axis of rotation, positioning means being provided and adapted to selectively rotate the first gear and said device in both directions independently of the rotation of the rotor hub. The positioning means may include a motor adapted to drive a gear wheel meshed with gear teeth on the first gear.

In a preferred embodiment, the gear teeth on the first and second gears are formed on an internal surface thereof.

Figure 2:
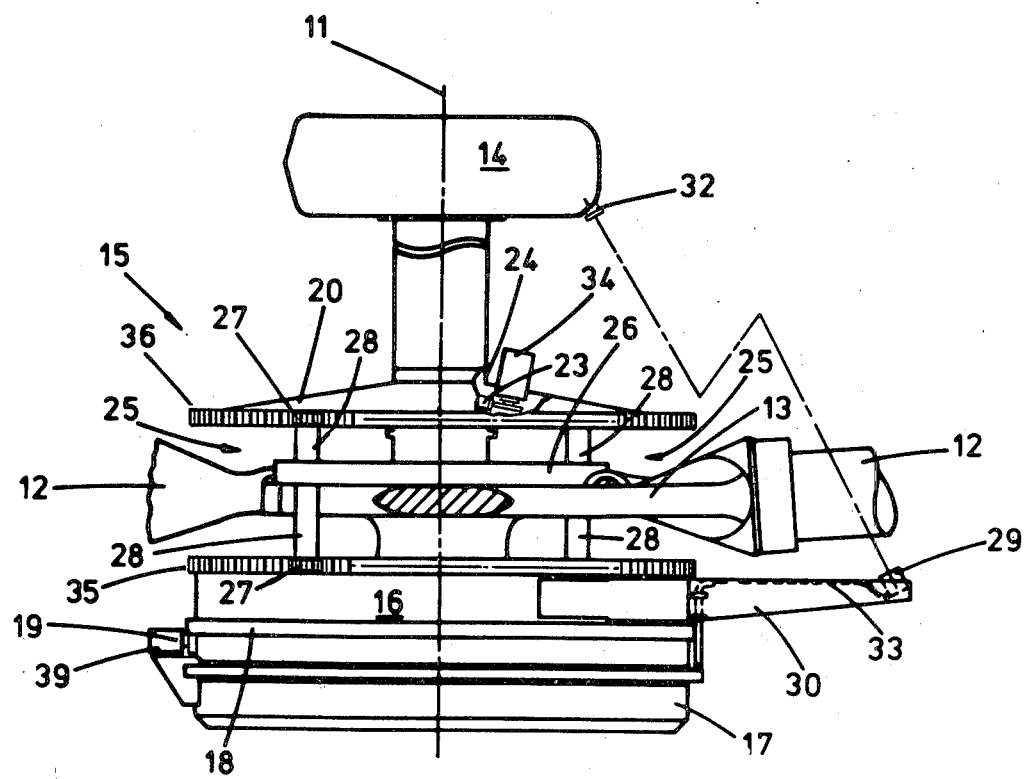
Figure 3:
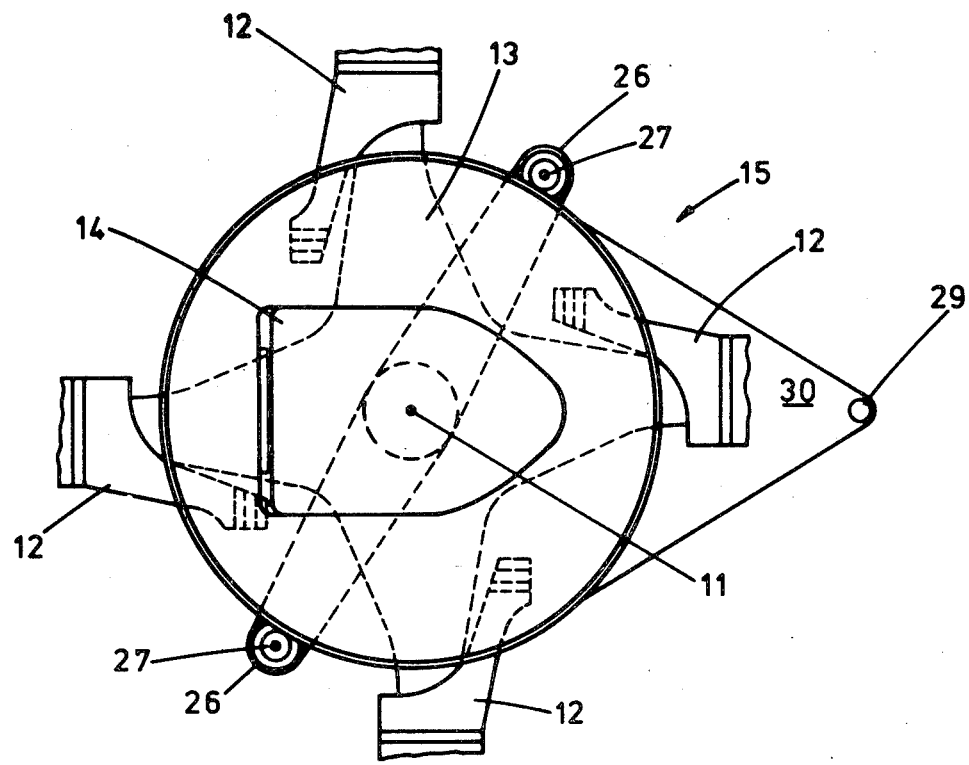
Figure 5:
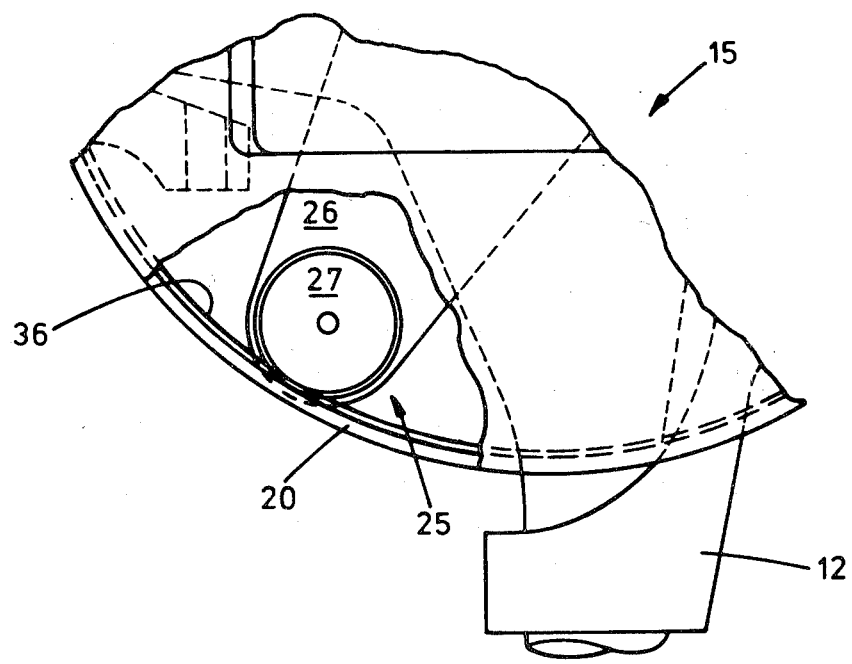
Figure 4:
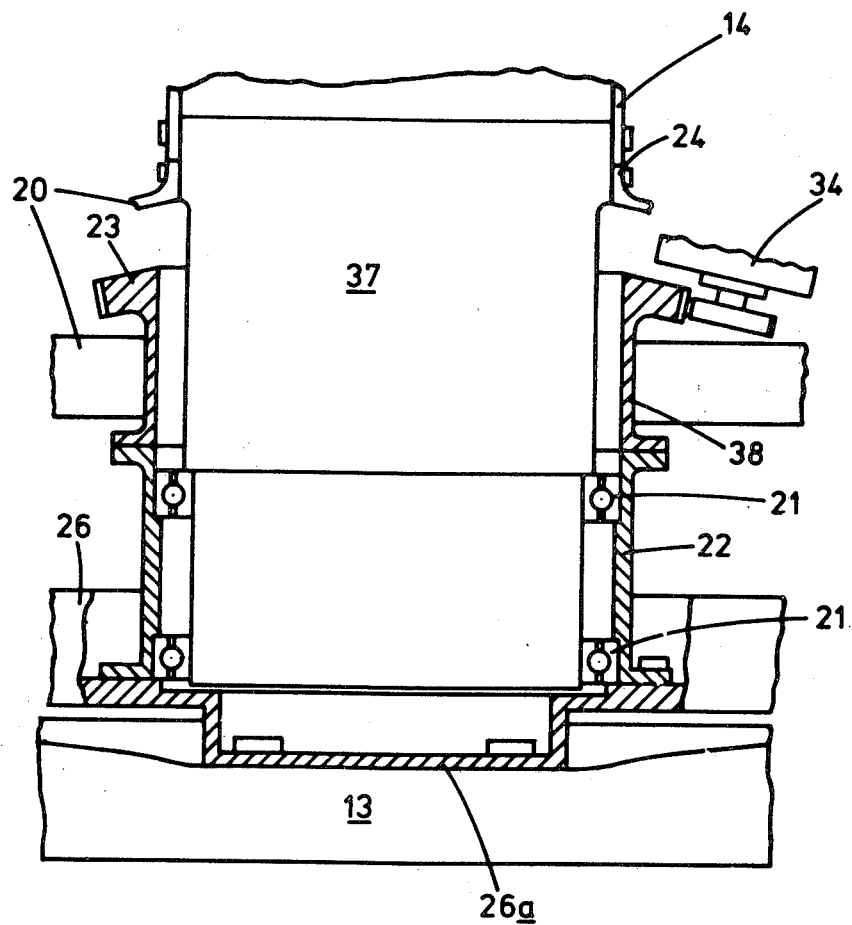
Figure 6:
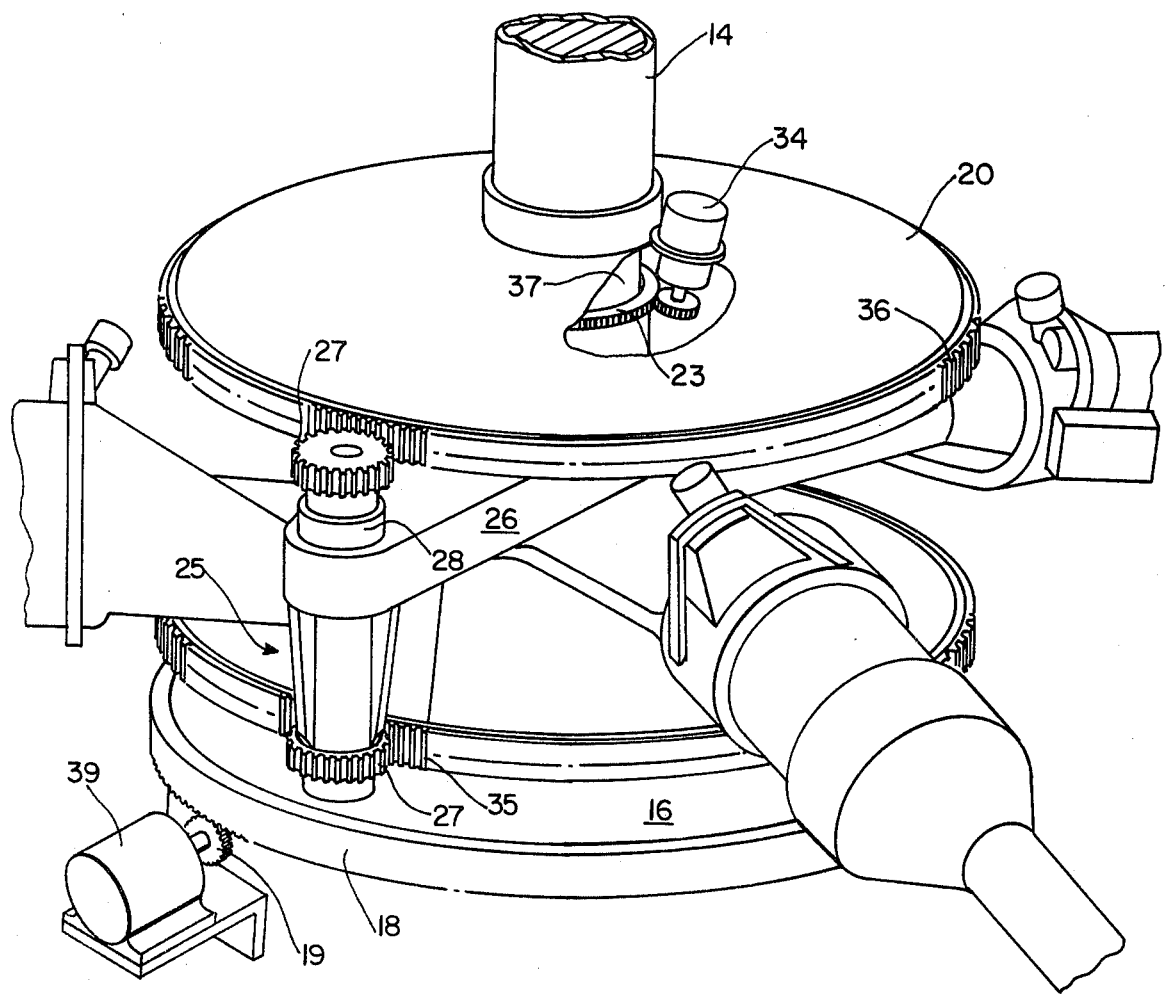

The invention will now be described by way of example only and with reference to the accompanying drawings in which:

FIG. 1 is a side view of a helicopter constructed in accordance with this invention, FIG. 2 is a fragmentary part sectioned side view of part of the helicopter of FIG. 1, FIG. 3 is a plan view, FIG. 4 is a fragmentary sectioned view of part of the apparatus of FIG. 2 on an enlarged scale, FIG. 5 is a fragmentary plan view similar to FIG. 3 and illustrating an alternative embodiment, and FIG. 6 is a perspective view of the apparatus of FIGS. 1 to 4.

Referring now to FIG. 1, a helicopter 10 has a main sustaining rotor arranged for rotation about an axis 11 and comprising four generally radially extending rotor blades 12 attached to a rotor hub 13.

A sight 14 is located above the rotor hub 13 generally concentrically of axis 11, and is attached by mounting apparatus generally indicated at 15.

FIGS. 2, 3 and 4 illustrate the mounting apparatus 15 in greater detail.

A first gear 16 having a plurality of peripheral gear teeth 35 is located below the rotor hub 13 concentrically of axis 11, and is rotatably mounted on a support structure 17 attached to helicopter structure. The gear 16 includes an annular toothed portion 18 concentric of axis 11 and meshed with a gear wheel 19 carried by an electric motor 39 supported from structure 17.

A second gear 20 is located above the rotor hub 13 concentrically of axis 11 and parallel to the first gear 16. Gear 20 is the same diameter as gear 16 and has peripheral gear teeth 36 equal in number to gear teeth 35 on gear 16.

A radially inwardly extending portion of gear 20 terminates in a flange 24 that is bolted to an external surface of one end of a central spigot 37 (FIG. 4) which is supported in bearings 21 in a housing 22 rotationally fixed to the rotor hub 13. A gear 23 is attached to housing 22 and is meshed with an electric supply generator 34 supported by the radial portion of gear 20.

The sight 14 is also bolted to the end of the spigot 37 (FIG. 4).

Synchronising means includes a yoke 26 rotationally fixed to the rotor hub 13 and located so that its radially extending arms are positioned between adjacent arms of the rotor hub 13. A synchronising gear set generally indicated at 25 is supported at each end of the yoke 26, each of the gear sets 25 comprising a pair of axially spaced-apart gear wheels 27 rotationally fixed to each other and rotatably mounted in housing portions 28 carried by the yoke 26. The gear wheels 27 have identical numbers of peripheral gear teeth and the gear wheels 27 of each synchronising gear set 25 are meshed respectively with the gear teeth 35 and 36 of the first and second gears 16 and 20.

Referring particularly to FIG. 4, it will be noted that yoke 26 has a central depending boss 26a bolted to an upper surface of the rotor hub 13. Housing 22 has upper and lower radial flanges, the lower of which provides for bolted attachment of the housing 22 to the yoke 26. The upper flange of housing 22 is bolted to a mating flange at a lower end of a further annular housing 38 whose upper end supports the integral gear 23 (see also FIG. 2).

A receiver unit 29 is mounted on a support flange 30 rotationally fixed to gear 16 and is aligned functionally with a transmitter unit 32 mounted on the head of the sight 14. A cable 33 is routed along flange 30 of the support structure 17 for connection to an amplifier and a C.R.T. (not shown).

The embodiment illustrated in FIG. 5 is similar to that previously described except that the gear teeth 35 and 36 (only the teeth 36 of the top gear 20 being shown in the illustration) are formed on an internal surface of the respective gears 16 and 20. The teeth are similary meshed with gears 27 of the respective synchronising gear sets 25 and it is to be noted that the arrangement of FIG. 5 results in a shortening of the length of yoke 26 compared with the previous embodiment, which therefore also reduces the weight, and the meshed gears are protected from the ingress of dirt and moisture.

Operation of the apparatus of FIGS. 2 and 3 will now be described with reference to its application to the helicopter embodiment illustrated in FIG. 1.

Yoke 26 and the attached synchronising gear sets 25 are rotated with the rotor hub 13 and attached rotor blades 12 about the axis 11. Since the wheels 27 of each synchronising gear set 25 are meshed respectively with the gear teeth 35 of stationary gear 16 and the gear teeth 36 of gear 20 that is supported by the central spigot 37 on bearings 21, the wheels 27 run around the periphery of gears 16 and 20, whereby the upper gear 20 is rotationally fixed to the stationary gear 16 and no rotary movement of gear 20 or spigot 37 occurs.

The sight 14 is also supported from the spigot 37 and is thereby maintained stationary and in a desired direction of operation during rotation of the rotor hub 13.

A further important feature of the invention is the provision of positioning means enabling the sight 14 to be selectively rotated about axis 11. This is achieved by energising motor 39 to rotate wheel 19 which is meshed with teeth 18 causing corresponding rotation of gear 16 about the axis 11. Rotation of the gear 16 is superimposed on the rotation of gear wheels 27 of the synchronising gear sets 25 and is transmitted thereby to cause a corresponding rotational movement of upper gear 20 and, therefore, the spigot 37 and the attached sight 14. Thus, by this means, the sight 14 can be selectively rotated in azimuth and can be selectively stopped and retained in a desired azimuthal position.

Cable 33 is coiled around structure 17 so as to enable the sight 14 to be rotated through 270 degrees, i.e. 90 degrees in one direction from a datum forward-facing direction, and 180 degrees in the other direction.

Rotation of the rotor hub 13 is transmitted through the yoke 26 and housings 22 and 38 to rotate gear 23 which drives the generator 34 to provide an electrical supply to power the transmitter/receiver unit 32 on the sight 14. Since gear 16 is always rotationally fixed to the sight 14, the respective transmitter/receiver units 29 and 32 are retained in functional alignment regardless of their azimuthal position.

Any suitable means such as laser or micro-wave signal means may be used to transmit the necessary signals between transmitter/receiver units 29 and 32.

Thus, the present invention enables a stationary or independently rotatable device, such as a sight or an aerial, to be mounted above the sustaining rotor of a helicopter, and does not rely on a hollow stationary shaft through the rotor and transmission. This invention therefore extends considerably the range of helicopters on which such a device can be fitted retrospectively, and does not restrict new designs of helicopter on which such a facility is desired to a design having such a hollow stationary central shaft.

Whilst two embodiments have been described and illustrated it will be apparent that many modifications can be made without departing from the scope of the invention as defined in the appended claims. For example, housing 22 could be formed integral with yoke 26 and could be formed with gear 23 to dispense with the separate housing 38. The range of permissible angular movement of the sight 14 can be extended to encompass 360 degrees with suitable routing of the cable 33.

What is claimed is:

1. A helicopter having a main sustaining rotor comprising a rotor hub and a plurality of radially extending rotor blades arranged for rotation about a generally vertical axis and including apparatus for supporting a stationary or independently rotatable device above the rotor, wherein said apparatus comprises a first ring gear below the rotor hub and supported from helicopter structure concentrically of the axis of rotation, a second ring gear above the rotor hub having the same number of gear teeth as the first gear, support means for supporting the second ring gear concentrically of the axis of rotation and in a manner permitting relative rotation of the rotor hub, and synchronising means rotationally fixed to the rotor hub and meshing with said first and second gears.

2. A helicopter as claimed in claim 1, wherein said synchronising means comprise a pair of spaced-apart gear wheels rotationally fixed to each other.

3. A helicopter as claimed in claim 2, wherein said pair of gear wheels are supported at the end of a yoke member extending radially from a fixed attachment to the rotor hub.

4. A helicopter as claimed in claim 1, wherein said synchronising means comprise two pairs of spaced-apart gear wheels, the wheels of each pair being rotationally fixed to each other, respectively supported at the opposite ends of a yoke member extending across the axis of rotation and attached centrally to the rotor hub.

5. A helicopter as claimed in claim 1, wherein said support means comprise a central spigot located concentrically of the axis of rotation in axially spaced-apart bearings located in a housing rotationally fixed to the rotor hub.

6. A helicopter as claimed in claim 5, wherein said housing supports an annular gear adapted to drive an electric generator supported by said second gear.

7. A helicopter as claimed in claim 5, wherein said device is rotationally fixed to an upper end of said spigot.

8. A helicopter as claimed in claim 1, wherein said first gear is mounted on the helicopter structure for rotation around the axis of rotation, and including positioning means adapted to selectively rotate said first gear and said device in both directions indpendently of the rotation of the rotor hub.

9. A helicopter as claimed in claim 8, wherein said positioning means include a motor adapted to drive a gear wheel meshed with gear teeth on said first gear.

10. A helicopter as claimed in claim 1, wherein said apparatus includes a signal transmitter/receiver unit operationally aligned with a similar unit on said device.

11. A helicopter as claimed in claim 10, wherein the unit on the apparatus is located at the end of a radially extending support flange rotationally fixed to said first gear.

12. A helicopter as claimed in claim 1, wherein the gear teeth on said first and second gears are formed on an internal surface thereof.

* * * * *